Aug. 29, 1972   R. A. ELKIN   3,687,795
TUBULAR LAMINATE

Filed Jan. 28, 1970   2 Sheets-Sheet 1

INVENTOR.
ROBERT A. ELKIN
BY
Edwin D. Grant
ATTORNEY

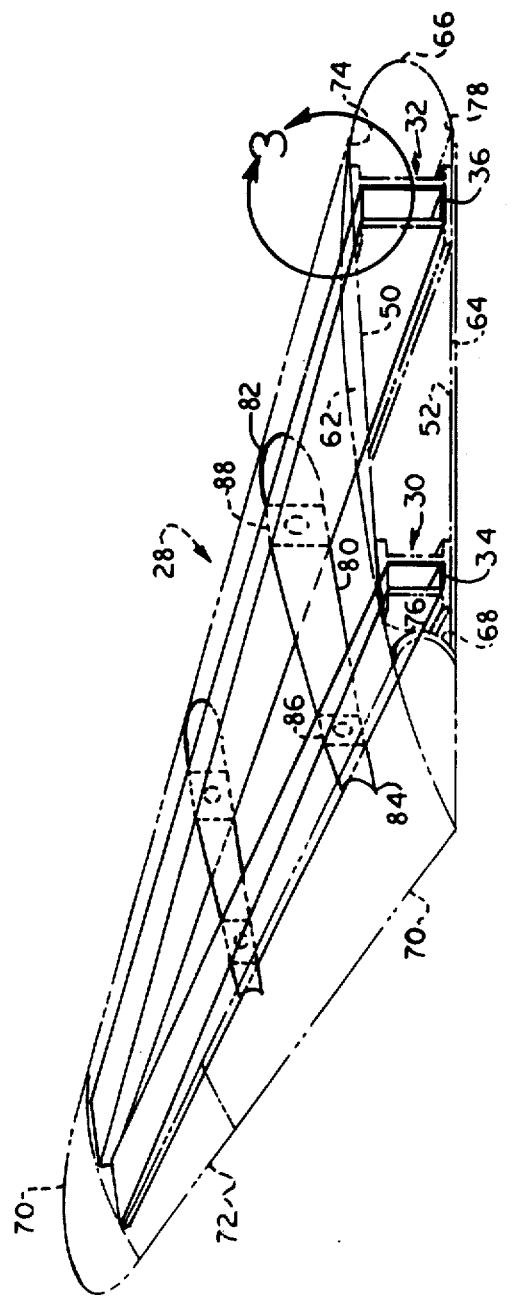

United States Patent Office 3,687,795
Patented Aug. 29, 1972

3,687,795
TUBULAR LAMINATE
Robert A. Elkin, 3043 Cheyenne Road,
Riverside, Calif. 92506
Filed Jan. 28, 1970, Ser. No. 6,334
Int. Cl. E04c 3/30
U.S. Cl. 161—47
1 Claim

ABSTRACT OF THE DISCLOSURE

Tubular laminate is formed by winding or laying tape around an elongate mandrel in oblique relation to the longitudinal axis thereof. The mandrel gradually increases in thickness and proportionately decreases in width in one longitudinal direction, so that the perimeter of the mandrel is constant throughout its length. The tape is preferably impregnated with liquid resin, which, when cured, bonds together and imparts rigidity to the windings to thereby provide the tubular laminate. The mandrel is subsequently removed.

BACKGROUND OF THE INVENTION

This invention relates to structural members and a method of forming the same, and more particularly to a method of forming a tubular laminate that is suitable for use in the construction of assemblies which must have a high strength-to-weight ratio, such as aircraft components.

Structural members of aircraft have long been fabricated of lightweight metals, chiefly aluminum alloys. However, it has recently been found that structural members comprised of laminated plastics arranged in a sandwiched type construction can also advantageously be used in aircraft. Not only is the strength-to-weight ratio of laminated plastic structural members comparable or superior to the strength-to-weight ratios of structural members fabricated of aluminum alloys, but also the physical characteristics of a laminated plastic structural member can more conveniently be controlled so that its strength is greatest in the direction in which maximum load will be applied.

Sandwiched type laminated structural members are fabricated by bonding together tubular beams, cellular cores, and facing sheets to thereby provide a box type structure which is light in weight and capable of resisting multi-axial stresses such as those imposed upon an aircraft wing. The design of such structural members has heretofore been limited, however, to arrangements in which the aforesaid tubular beams have a uniform shape along the length thereof. The conventional method of manufacturing such beams involves winding or laying layers of fibrous tape around an elongate mandrel at different angles relative to the longitudinal axis of the mandrel, the tape preferably being impregnated with a resin which can be cured to bond together and impart rigidity to the superposed tape windings and the mandrel being removed after said resin is cured. The shape of the mandrel which is used of course determines the shape of the beam formed therewith, and it has previously been the practice to use only mandrels having a uniform shape as there was no known way of winding or laying tape around a tapered mandrel while maintaining the lead angle of the tape at a constant oblique angle relative to the longitudinal axis of said tapered mandrel.

SUMMARY OF THE INVENTION

The present invention provides a method of fabricating a wound or wrapped tape beam which is tapered along its length and the tape layers of which are respectively disposed at constant lead angles relative to the longitudinal axis thereof. Since a beam constructed in accordance with the invention is tapered, it can advantageously be combined with cellular cores and facing sheets to form strong, lightweight structures which vary in thickness, such as aircraft wings. Briefly described, the improved laminated beam is formed by placing one or more layers of a suitable tape on a mandrel which along its length gradually increases in cross-sectional dimension in a first direction and gradually decreases in cross-sectional dimension in a second direction perpendicular to said first direction, so that the perimeter of said mandrel is constant throughout the longitudinal axis of the mandrel. The arrangement of the mandrel is thus such that the tape can be wound or laid therearound at any selected constant lead angle relative to the longitudinal axis of the mandrel. After the wrapped tape is processed to bond together the superposed portions thereof and impart rigidity thereto, the mandrel is removed from the stiff tubular laminate and the latter is either used alone as a structural member or, in accordance with the preferred form of using the same, is incorporated into the structure of a composite beam or other member.

DESCRIPTION OF THE DRAWINGS

FIG. 2 is a pictorial view of an aircraft wing comprising laminated beams of the type fabricated on the aforesaid mandrel.

DETAILED DESCRIPTION

Figure 1:
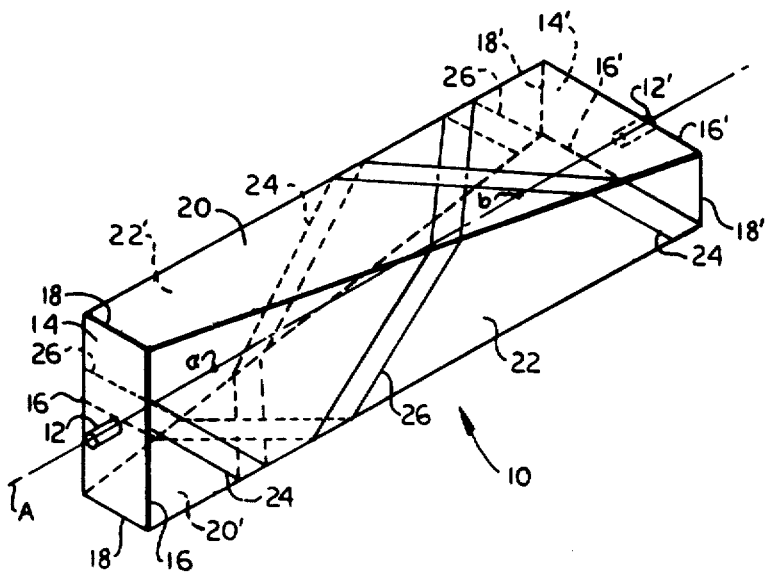
FIG. 1 is a pictorial view of one type of mandrel which can be used in the manufacture of a laminated beam in accordance with the present invention, the drawing also illustrating two tapes which are wound around the mandrel at constant oblique angles relative to each other and to the longitudinal axis of the mandrel.

In FIG. 1 reference number 10 designates generally an elongate, four-sided mandrel having a pivot 12, 12' fixedly secured co-axially to each of its end surfaces 14, 14', the pivots being adapted to be supported in a suitable mounting means so that the mandrel can be rotated about its longitudinal axis $a$. Mandrel 10 may be solid and formed of the mixture of polyvinyl alcohol, water and silica sand which is described in detail in U.S. patent application Ser. No. 795,232, filed by James Howard on Jan. 30, 1969, and assigned by him to Rohr Corporation, the assignee of the present application. As described in the prior Howard application, a mandrel formed of the aforesaid mixture can be dissolved by directing a stream of steam, hot water, and detergent against its surface, which enables the mandrel to be washed out of the tubular laminate formed thereon by the process disclosed herein. Alternatively, mandrel 10 may be formed of collapsible panels so that its components can be removed from the ends of the tubular laminate.

For the purpose of illustrating the invention, mandrel 10 is depicted in FIG. 1 as having the same rectangular shape at each end thereof, with the long edges 16, 16' of the rectangular end surfaces 14 turned at an angle of 90 degrees relative to each other. More specifically, the end surfaces 14, 14' of the mandrel are centered on, and disposed perpendicular to, the longitudinal axis of the mandrel, and the long edges 16 of the end surface 14 which is at the forefront of the drawing extend vertically whereas the long edges 16' of the end surface 14' which is at the rear extend horizontally, the long edges and the short edges 18, 18' of each end surface respectively having the same lengths. Planar surfaces 20, 20' respectively extend from the short edges 18 of end surface 14 to the long edges 16' of end surface 14', and planar surfaces 22, 22' likewise respectively extend from the long edges 16 of said end surface 14 to the short edges 18' of said end surfaces 14', the longitudinal edges of each of these surfaces being linear. Thus, the cross-sectional perimeter of the mandrel is the same at all points along the longitudinal axis thereof; for example, the perimeter of the cross section of the mandrel at point $a$ is the same as the perimeter of its cross section at point $b$.

The shape of mandrel 10 therefore permits tape to be wound around its periphery and advanced axially thereof at a constant lead angle, as illustrated in FIG. 1 by the tapes 24, 26 which are wound around the mandrel in opposite directions and with the portions of each tape that extend across surfaces 20, 20', 22, 22' respectively disposed at the same oblique angle relative to axis A. It will be understood by those skilled in the art that laminated beams may be formed not only by winding or wrapping a continuous tape around a mandrel but also by laying a plurality of tape segments on different areas of a mandrel in a particular angular relation to provide a beam having the desired capability of resisting loads of different types and magnitude. Hence it will be pointed out at this point that the term "wrapping" which appears in the appended claims is to be considered as applying to winding or laying a continuous tape around a mandrel of the type disclosed so as to dispose windings of said tape at a constant lead angle relative to the longitudinal axis of the mandrel, and also to laying separate strips of tape along the surfaces of said mandrel so that they are disposed at the same angle relative to its longitudinal axis. The invention is consequently not limited to tapes of a particular width, type, or winding arrangement, although the tape must of course be such that it can be processed after being wound on the mandrel so as to bond the superposed layers together and impart rigidity thereto. Thus it is possible to use tape the interstices of which are impregnated with resin before the tape is wound or laid, or tape which is coated with resin and then wound or laid while wet, or tape which is wound while dry and then impregnated with resin. A resin-impregnated tape suitable for use in the fabrication of wound-tape beams is that sold by Minnesota Mining and Manufacturing Company under their product designation XP-251S. After the required layers of such a tape have been placed on mandrel 10 the tape is subjected to elevated temperature and pressure, preferably by placing the mandrel in a vacuum bag and then placing the assembly in an autoclave, to thereby bond the layers together and form the same into a tubular laminate. Since curing cycles will vary for different resin-impregnated tapes which may be used in the disclosed fabrication process and since the techniques of applying pressure and heat by means of vacuum bags and autoclaves are well-known in the art, it is not considered necessary to describe a particular curing procedure herein.

Figure 3:
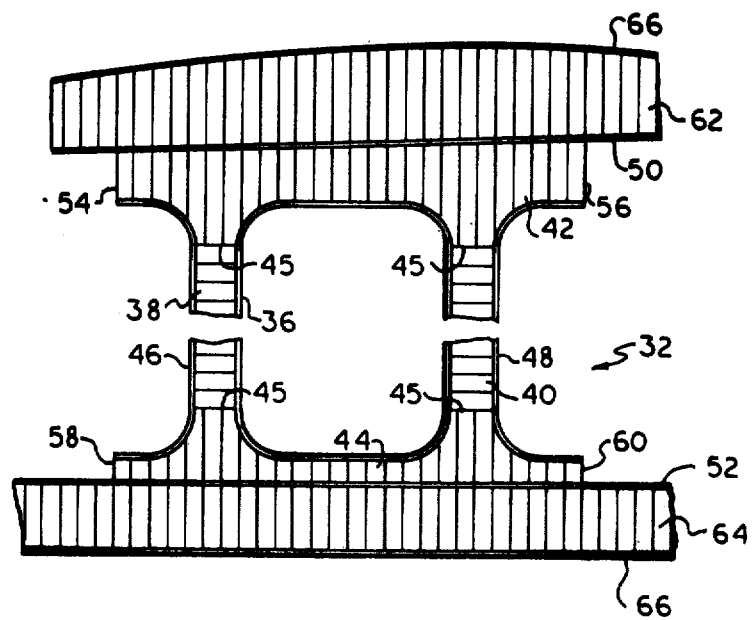
FIG. 3 is a detail view of a portion of the wing illustrated in FIG. 2, taken at the area which is enclosed within the circle designated by reference number 3 therein.

After mandrel 10 has been removed from the tubular laminate which has been formed thereon as described, the laminate can advantageously be employed in aircraft structures which are tapered in thickness along the length thereof, such as wings or empennage members. For example, FIG. 2 illustrates an aircraft wing 28 having two spars 30, 32 each of which includes a laminated beam 34, 36 formed by the method of the invention. More particularly, the beams 34, 36 respectively serve as the main, central members of the spars, and at the root of the wing the width of each beam is less than its height whereas at the outer end of the wing the height of each beam is less than its width, the length of the perimeter of each beam being constant at all cross-sections thereof. The beams are formed on mandrels which have the same length but which differ in cross-sectional dimensions, and as illustrated in FIG. 3 (wherein is shown on an enlarged scale the construction of spar 32, which is the same as that of spar 30) cores 38–44 of honeycomb material are respectively bonded to the sides of each beam, with the upper and lower cores 42, 44 projecting laterally from the vertically disposed sides of the beam and comprising edge portions 45 respectively bonded to the sides of cores 38 and 40 which extend longitudinal of said beam. Thin panels 46, 48 having U-shaped cross-sectional form are respectively bonded to the outer sides of cores 38 and 40 and to the adjacent sides of the laterally projecting portions of cores 42 and 44, these panels extending lengthwise of the beam 34, 36 with which they are associated. As can be seen in FIG. 2, a large panel 50 extends across the upper sides of both spars 30 and 32 and is bonded to the outer sides of the upper cores 42 thereof, and another large panel 52 extends across the lower sides of said spars and is bonded to the outer sides of the lower cores 44 thereof, these panels also extending lengthwise of beams 34 and 36 and respectively projecting a short distance forwardly from spar 32 and a short distance rearwardly from spar 34. Four edge closures 54–60 are respectively bonded to the longitudinal edges of cores 42 and 44, to the longitudinal edges of panels 46 and 48, and to the inner sides of panels 50 and 52. Respectively bonded to the outer sides of panels 50 and 52 and coextensive therewith are two cores 62, 64 of honeycomb material, and bonded to the outer sides of these cores is an outer skin 66 which extends forwardly from spar 32 to form the leading edge of wing 28. The outer skin also extends rearwardly from both the upper and lower sides of spar 30 and is integrally joined to a curved panel 68 which extends lengthwise of the wing and forms one edge of a recess in the latter for a landing flap 70 and an aileron 72. The forward and aft edges of panel 50 are attached to the outer skin at the points respectively designated 74 and 76 in FIG. 2, the forward edge of panel 52 is attached to said skin at the point designated 78 in the same drawing, and the aft edge of said panel 52 is attached to panel 68. It will be noted that wing 28 also comprises a plurality of ribs each formed of a first section 80 which extends between and is fixedly connected to spars 30 and 32, a second section 82 which is attached to the forward side of spar 32 and projects forwardly therefrom, and a third section 84 which is attached to the rear side of spar 30 and projects rearwardly therefrom. Wall members 86 and 88 are respectively fixed in position within beams 34 and 36 of the spars so as to align with the rib sections, these wall members being incorporated in the mandrels on which the beams are formed and bonded at their edges to the innermost layer of tape in said beams (the mandrel sections between the wall members being preferably formed of the soluble material mentioned hereinbefore so that they can readily be removed from the beams). A wing tip 90 is secured to the outer ends of the spars by suitable means.

If desired, all components of wing 28 may be formed of laminated plastics. Panels 46 and 48 may be formed by cutting longitudinal edge sections from wound-tape beams of the same type as beams 34 and 36. It will be obvious to persons skilled in the art of composite type structures that beams formed in accordance with the principles of the disclosed invention can be used in many different ways, and the particular arrangement illustrated in FIGS. 2 and 3 is presented by way of example only.

It will also be apparent that the fabricating method disclosed herein is not limited to the use of a four-sided mandrel which has the same shape at each end, or even to a mandrel having four sides. Thus, for example, one end of the mandrel 10 illustrated in FIG. 1 may be square in cross section, the only requirement for a mandrel in accordance with the invention being that its cross-sectional perimeter is the same at all points along the longitudinal axis of the portion thereof that is to be wound with tape to form a tubular laminated beam. Hence the scope of

What is claimed and desired to be secured by U.S. Letters Patent is:

1. A tapered, laminar, box beam comprising a plurality of superposed layers of tape-like material of high tensile strength extending diagonally about a removable hollow core, the width of the beam increasing inversely to its height at a rate maintaining a constant periphery throughout the length of the beam, whereby, both edges of the tape-like material are of substantially equal length and are stressed substantially equally throughout the length of the winding, and hardened bonding material impregnating the layers of tape-like material and bonding it into a unified structure.

References Cited
UNITED STATES PATENTS

| | | | |
|---|---|---|---|
| 2,739,350 | 3/1956 | Lampman | 156—189 |
| 2,593,714 | 4/1952 | Robinson | 156—187 |
| 3,301,727 | 1/1967 | Verrell et al. | 156—189 |
| 2,755,216 | 7/1956 | Lemons | 156—189 |
| 2,519,036 | 8/1950 | Ford et al. | 156—189 |

CARL D. QUARFORTH, Primary Examiner

B. H. HUNT, Assistant Examiner

U.S. Cl. X.R.

156—185